United States Patent
Tsuchiya et al.

(10) Patent No.: US 7,229,709 B2
(45) Date of Patent: Jun. 12, 2007

(54) METHOD FOR PRODUCING NANOPARTICLE LAYER HAVING UNIFORM EASY AXIS OF MAGNETIZATION, MAGNETIC RECORDING MEDIUM HAVING SUCH LAYER, ITS PRODUCTION METHOD, AND ITS PRODUCTION APPARATUS

(75) Inventors: Yuko Tsuchiya, Tokorozawa (JP); Motoyasu Terao, Hinode (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 10/750,882

(22) Filed: Jan. 5, 2004

(65) Prior Publication Data
US 2004/0137220 A1 Jul. 15, 2004

(30) Foreign Application Priority Data
Jan. 14, 2003 (JP) .............................. 2003-005242

(51) Int. Cl.
G11B 5/66 (2006.01)
G11B 5/70 (2006.01)

(52) U.S. Cl. .................................. 428/842.2; 428/843

(58) Field of Classification Search ............ 428/843.7, 428/842.1, 842.2, 842.3, 843
See application file for complete search history.

(56) References Cited

U.S. PATENT DOCUMENTS

| | | | |
|---|---|---|---|
| 5,419,938 A * | 5/1995 | Kagotani et al. | 428/839.3 |
| 6,136,428 A * | 10/2000 | Truong et al. | 428/323 |
| 6,162,532 A | 12/2000 | Black et al. | |
| 6,254,662 B1 | 7/2001 | Murray et al. | |
| 6,262,129 B1 | 7/2001 | Murray et al. | |
| 6,302,940 B2 | 10/2001 | Murray et al. | |
| 6,566,665 B2 | 5/2003 | Baglin et al. | |
| 2003/0157371 A1 | 8/2003 | Ihara et al. | |

FOREIGN PATENT DOCUMENTS

JP 2003-132519 10/2001

OTHER PUBLICATIONS

Shouheng Sun, C.B. Murray, Dieter Weller, Liesl Folks, Andreas Moser, "Monodisperse FePt Nanoparticles and Ferromagnetic FePt Nanocrystal Superlattices", Science, vol. 287, Mar. 17, 2000, pp. 1989-1992.

Weller, D. et al. "MOKE Spectra and Ultrahigh Density Data Storage Perspective of FePt Nanomagnet Arrays", IEEE Transactions on Magnetics, vol. 37, No. 4, Jul. 2001, pp. 2185-2187.

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

The magnetic recording medium provided is produced by forming a substrate having a nanoparticle layer comprising an array of nanoparticles, and an organic compound between said array of nanoparticles; irradiating the nanoparticle layer with an infrared beam to magnetize the nanoparticles; applying a magnetic field to the nanoparticle layer to orient easy axis of magnetization of the magnetic nanoparticles in a substantially uniform direction; and irradiating the nanoparticle layer with an ultraviolet beam to bind said organic compound to thereby produce a magnetic recording medium wherein easy axis of magnetization of the nanoparticles has been oriented in a direction substantially parallel to a direction at a particular angle with the substrate. The resulting magnetic recording medium experiences no deterioration of the underlying layer or the soft magnetic layer, and exhibits good magnetic properties.

8 Claims, 10 Drawing Sheets

SIDE VIEW

FIG. 4A
TOP VIEW

FIG. 4B
SIDE VIEW

FIG. 5A
TOP VIEW

FIG. 5B
SIDE VIEW

FIG. 6
SIDE VIEW

FIG. 7A SIDE VIEW

FIG. 7B SIDE VIEW

FIG. 7C SIDE VIEW

FIG. 7D SIDE VIEW

FIG. 8A PRIOR ART
TOP VIEW

FIG. 8B PRIOR ART
TOP VIEW

FIG. 8C PRIOR ART
SIDE VIEW

SIDE VIEW

FIG. 10A
SIDE VIEW

FIG. 10B
PERSPECTIVE VIEW

FIG. 11A
SIDE VIEW

FIG. 11B
PERSPECTIVE VIEW

METHOD FOR PRODUCING NANOPARTICLE LAYER HAVING UNIFORM EASY AXIS OF MAGNETIZATION, MAGNETIC RECORDING MEDIUM HAVING SUCH LAYER, ITS PRODUCTION METHOD, AND ITS PRODUCTION APPARATUS

PRIORITY CLAIM

This application claims priority under 35 U.S.C. §119 to Japanese patent application P2003-005242 filed Jan. 14, 2003, the entire disclosure of which is hereby incorporated herein by reference.

FIELD OF THE INVENTION

This invention relates to a magnetic, a thermomagnetic, or a magnetooptical recording medium used in a magnetic disk system or the like, a method for recording using such magnetic recording medium, and an apparatus for producing such magnetic recording medium.

BACKGROUND OF THE INVENTION

With the recent increase in the capacity of the magnetic recording system, attempts have been made to increase recording density of the magnetic recording medium. In order to increase the density of the recording bit on the magnetic recording medium, decrease in the noise of the medium is necessary, and for this, use of smaller magnetization reversal units on the magnetic recording layer is required. Reduction in the size of the magnetic crystal grains constituting the magnetic recording layer has been found effective for such increase in the recording density. However, use of excessively minute magnetic crystal grains is known to invite thermal demagnetization wherein magnetization on the magnetic recording layer becomes thermally unstable. Use of magnetic crystal grains having a uniform size distribution is important to reduce the thermal demagnetization. In other words, size reduction of the magnetic crystal grains simultaneously with the reduction in the grain size dispersion or standard deviation is required in the medium adapted for use in high density recording.

Conventional magnetic recording mediums have been produced by sputtering a seed layer, an underlying layer, a magnetic layer functioning as a recording layer, a protective layer, and the like in this order on a circular glass or aluminum substrate. In the magnetic layer formed by sputtering, size dispersion of the magnetic crystal grains constituting the magnetic layer is large. The size dispersion and the average grain size, however, can be reduced in the case of sputtering by controlling the conditions of the film deposition. Still, the control of the grain size dispersion is difficult, and it is said that the grain size dispersion is limited to the level of about 20%.

An attempt to overcome the need for reducing the size and size dispersion degree of the magnetic crystal grains is disclosed in Patent Document 1, (Japanese Patent Laid-Open No. 2000-48340, corresponding to U.S. Pat. No. 6,162,532) and a document relevant to this Patent Document 1, is Non-Patent Document 1, Science, vol. 287, pages 1989 to 1992 (issue of Mar. 17, 2000).

In Patent Document 1 and Non-Patent Document 1, the magnetic nanoparticles constituting the recording layer are produced not by the conventional sputtering but by a chemical synthesis. In Non-Patent Document 1, FePt alloy (uniaxial anisotropy constant, Ku: $7\times10^6$ J/m$^3$) which is a hopeful candidate for the near future high recording density is synthesized in an organic solvent by reacting an iron pentacarbonyl compound (Fe(CO)$_5$) and an acetylacetone platinum compound (Pt(acac)$_2$). According to the Patent Document 1 and the Non-Patent Document 1, magnetic nanoparticles having an arbitrary diameter in the range of at least 3 nm and up to 10 nm with the size dispersion standard deviation of 5 to 10% could be selectively produced by using the chemical synthesis as described above.

Figure 1:
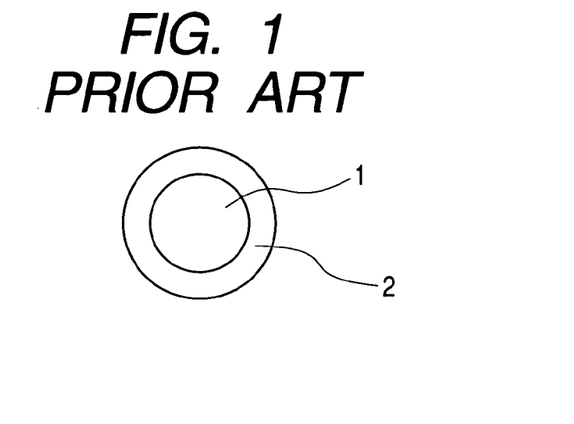
FIG. 1 is a view showing prior art nanoparticles covered with a coating.
Figure 2A:
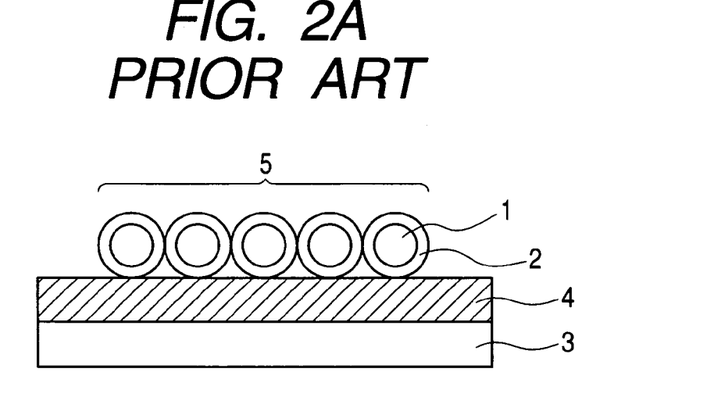
FIGS. 2A-2B are prior art cross-sectional views of the magnetic recording medium having a nanoparticle layer.

The magnetic nanoparticle produced by the chemical sysnthesis as described in the Patent Document 1 and the Non-Patent Document 1 comprises a magnetic metal as indicated 1 in FIG. 1, which comprises either a single magnetic metal element or an alloy containing at least one magnetic metal element. Such magnetic nanoparticle is coated with an organic compound as indicated by 2. This coating of the organic compound improves adhesion both between the magnetic nanoparticles and the substrate surface and between the adjacent magnetic nanoparticles, and there is disclosed that such organic compound coating facilitates the stable production of the ordered array of the magnetic nanoparticles in the formation of the monolayer or multilayer film. FIG. 2 shows a monolayer film of magnetic nanoparticles. In FIG. 2(a), the layer of magnetic nanoparticle layer 5 is formed on the underlying layer or the soft magnetic layer 4 formed on the substrate 3, and the magnetic nanoparticle 1 is covered with the coating 2.

In addition to the role as described above, the coating of the organic compound is believed to play an important role of improving the storage stability of the colloid solution of the magnetic nanoparticles. The presence of the organic compound coating between the magnetic nanoparticles in the resulting film is also believed to reduce the magnetic interaction between the adjacent magnetic nanoparticles. This phenomenon may be similar to the phenomenon found in the medium having the layer of CoCrPt, CoCrTa, or the like formed by sputtering wherein Cr segregated layer is formed at the boundary of the magnetic crystal grains.

Typical organic compounds used for the coating in the Patent Document 1 are organic materials containing a long chain organic compound represented by the formula: R—X wherein R is desirably a member selected from straight and branched hydrocarbon and fluorocarbon chains containing 6 to 22 carbon atoms, and X is desirably a member selected from carboxylic acids, phosphonic acids, phosphinic acids, sulfonic acids, sulfinic acids, and thiols, among which oleic acid being mentioned as the most desirable for use as the coating.

Figure 2B:
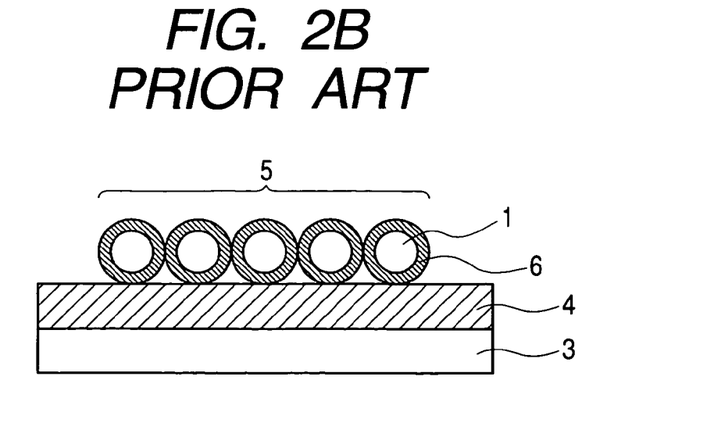

Non-Patent Document 1 describes that, when the recording layer comprising magnetic nanoparticles formed was subjected to a high temperature heat treatment at about 560° C., the coating of the organic compound such as oleic acid did not evaporate, but became carbonized as indicated by 6 in FIG. 2(b) and remained around the magnetic nanoparticles. Such carbonized organic substance remaining between the magnetic nanoparticles is believed to contribute for the reduction of the magnetic interaction between the magnetic particles. Non-Patent Document 1 also describes that crystallographic structure of the FePt magnetic nanoparticles changes by the heat treatment from the fcc structure at the time of its chemical sysnthesis into the ordered structure L10. In the case of FePt, magnetism is not found in the fcc structure, and ferromagnetism is developed when it takes the ordered structure. It is to be noted that the magnetic field was not applied in the heat treatment after the film formation. Accordingly, the easy axis of magnetization of the magnetic nanoparticles is believed to be randomly oriented.

In the technology described in Non-Patent Document 1, the nanoparticle layer formed is subjected to a high temperature treatment at about 500° C. to 600° C. to thereby convert the nanoparticle crystal structure from fcc structure to L10 ordered structure to thereby magnetize the nanoparticles to the degree sufficient for use as a recording medium. As a result of such high temperature heat treatment, the nanoparticle layer experiences disturbance in the array of the nanoparticles as well as agglomeration of the nanoparticles, and when such nanoparticle layer is used in a magnetic recording layer, the layer suffers from an insufficient flatness. The high temperature heat treatment also results in the undesirable deterioration of the underlying layer, the soft magnetic layer, and the like between the nanoparticle layer and the substrate. In spite of the high magnetization degree of the nanoparticle layer after the high temperature heat treatment, it is difficult to use such nanoparticle layer in a magnetic recording medium wherein the substrate is actually rotated for the reading and writing of the information by the read head.

On the other hand, in the technology described in Patent Document 1, the easy axis of magnetization of the magnetic nanoparticles constituting the recording layer is randomly oriented, and orientation of the easy axis of magnetization in a particular direction such as in-plane direction of the medium or thickness direction of the medium is difficult. As a consequence of such difficulty, the resulting magnetic recording layer suffers from inferior magnetic properties compared to the conventional in-plane recording or perpendicular recording medium.

SUMMARY OF THE INVENTION

In view of the situation as described above, the present invention may include providing a magnetic recording medium having a nanoparticle layer wherein the high temperature heat treatment that had been conducted for magnetization of the nanoparticles is no longer necessary, flatness of nanoparticle layer has been improved, the underlying layer and the soft magnetic layer do not experience deterioration, easy-axis of magnetization of the nanoparticles is substantially parallel to a direction which is at a particular angle to said substrate surface, and excellent magnetic properties are realized. Other features of the invention may include to providing a method for producing such medium and apparatus used in producing such medium.

The features as described above are attained by using a magnetic recording medium at least comprising a substrate having a surface; and a nanoparticle layer comprising an array of nanoparticles having an average particle size of at least 1 nm and not more than 20 nm, and containing at least one element selected from Fe, Co, Ni, Mn, Sm, Pt, and Pd, and an organic compound between said array of nanoparticles; wherein easy axis of magnetization of said nanoparticles is substantially parallel to a direction which is at a particular angle to said substrate surface. Such magnetic recording medium can be produced by a method for producing a magnetic recording medium comprising the steps of: forming a nanoparticle layer on a substrate having a surface or on an underlying layer or a soft magnetic layer formed on said substrate by arranging particles in a substantially ordered array, said particles each comprising a nanoparticle and an organic compound coating said nanoparticle, and said nanoparticles having an average particle size of at least 1 nm and not more than 20 nm, and containing at least one element selected from Fe, Co, Ni, Mn, Sm, Pt, and Pd; irradiating said nanoparticle layer with an infrared beam to magnetize said nanoparticles and produce magnetic nanoparticles; applying a magnetic field to said nanoparticle layer to orient easy axis of magnetization of said magnetic nanoparticles in a substantially uniform direction; and irradiating said nanoparticle layer with an ultraviolet beam to bind said organic compound. In addition, such magnetic recording medium can be produce by an apparatus having an infrared irradiating section for irradiating a particular region of the substrate having the nanoparticle layer formed thereon with an infrared beam; a magnetic field applying section for applying a magnetic field to said particular region after the irradiation of the infrared beam; and an ultraviolet irradiating section for irradiating said particular region with an ultraviolet beam after the application of the magnetic field.

DETAILED DESCRIPTION OF THE PREFERRED EMBODIMENTS

In the magnetic recording medium as described above, the nanoparticles may contain at least one magnetic metal element selected from Fe, Co, Ni, Mn, Sm, Pt, Pd, and the like. The nanoparticles may also be magnetic nanoparticles comprising an intermetallic compound of the aforesaid elements, a binary alloy of said elements, or a ternary alloy of said elements. In view of the expected higher recording density in near future, the preferred are magnetic nanoparticles having the composition of FePt or FePd having a large uniaxial anisotropy constant (Ku), or a ternary alloy comprising FePt or FePd and a third element. The third element used may be Cu, Ag, Au, Ru, Rh, Ir, Pb, or Bi, as well as other elements. Magnetic nanoparticles having a structure comprising the core of a binary alloy which is typically FePt or FePd and the surrounding shell comprising the aforementioned ternary element, Pt or Pd are also useful.

The organic compound which is present between the array of nanoparticles may be the organic compound coating the nanoparticles. Such organic compound may be an unsaturated fatty acid compound such as oleic acid, or an amine compound of an unsaturated fatty acid such as oleylamine. The compounds which may be used also include a compound having thiol group, as well as a compound having at least one carbon-carbon double bond or triple bond. Other organic compounds may also be used for such coating.

The organic compound between the array of nanoparticles may further contain a compound which is capable of binding the organic compound coating the nanoparticles when it is irradiated with a light beam or a radiation or by applying heat. To be more specific, the compound represented by the following general formulae (1) to (4) may be used.

In the formulae, R1 to R9 are independently a functional group selected from carboxylic acids, phosphonic acids, phosphinic acids, sulfonic acids, sulfinic acids, thiols, hydroxyls, and hydrogen atom; or a hydrocarbon group containing carbon-carbon double bond or ether bond. The compound represented by the general formulae (1) to (4) are crosslinking agents, and crosslinking agents having other structures may also be used.

Figure 8A:
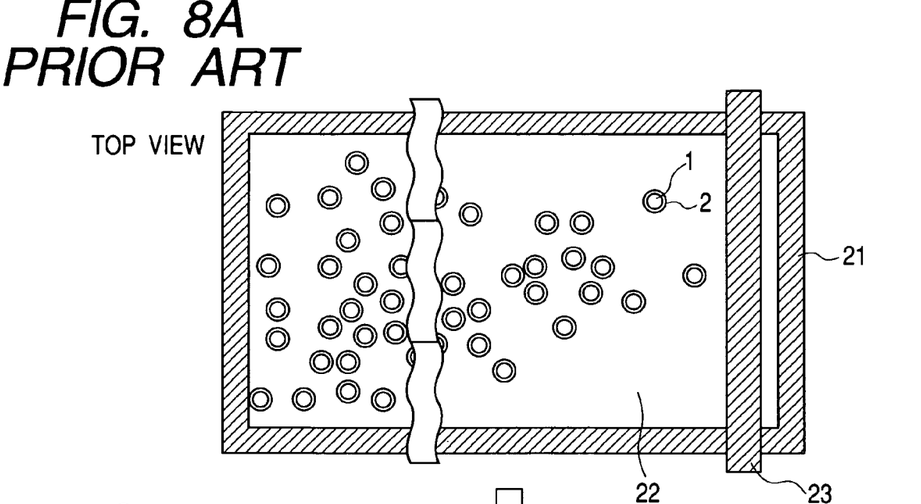
FIGS. 8A-8C are top and side views showing a manufacturing process for producing a magnetic recording medium having a nanoparticle layer by Langmuir-Blodgett method.
Figure 8B:
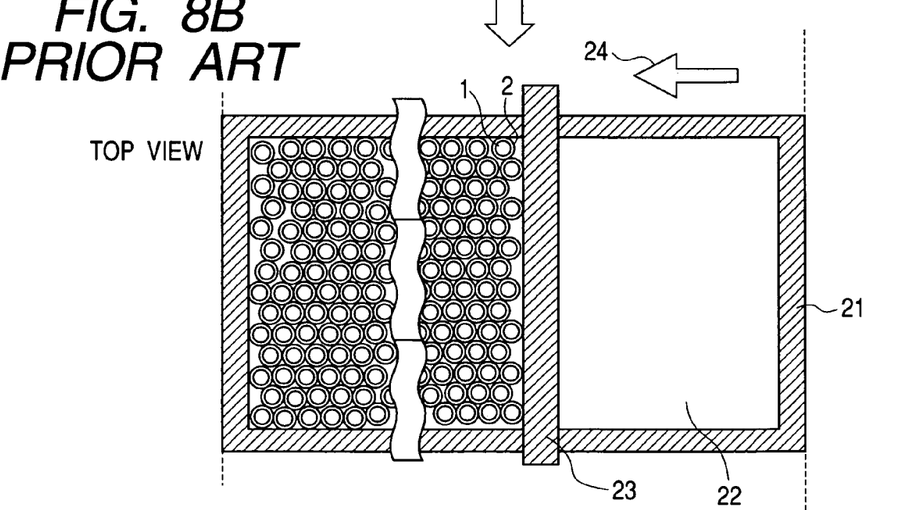
Figure 8C:
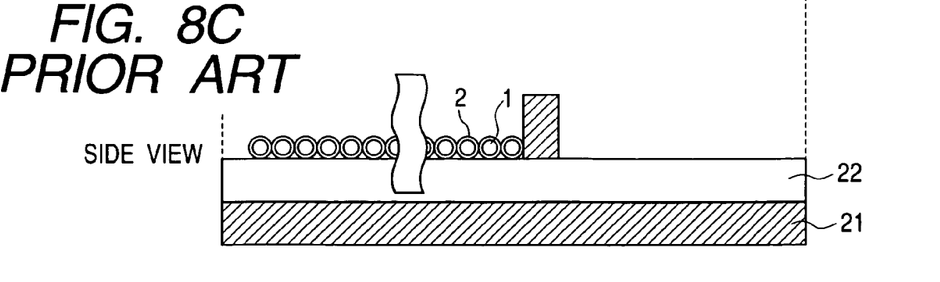

The recording layer of the magnetic recording medium according to the present invention may be constituted from a monolayer film or a multilayer film of nanoparticles. The monolayer or the multilayer nanoparticle layer may be formed by using Langmuir-Blodgett (LB) method as shown in FIG. 8A-8C. When LB method is used, the nanoparticle layer may be formed by the procedure as described below. First, a colloid solution of the nanoparticles which have been coated with an organic compound 2 is gradually added dropwise onto the surface of clean water 22 that has been filled in a trough 21 to form a monolayer film of nanoparticles wherein the nanoparticles are sparsely arranged. Next, after evaporating the solvent, the nanoparticle monolayer film of sparsely arranged nanoparticles is gently compressed by a moving barrier 23 to the direction 24, and when the compression is terminated at the pressure wherein the distance between the nanoparticle is at its least while maintaining the form of the monolayer film, the film wherein the nanoparticles are packed at their closest is obtained. Then, the substrate or the substrate having an underlying layer or a soft magnetic layer formed thereon held at horizontal position is brought in contact with the water surface, and pulled up to thereby transfer the monolayer film onto the substrate and obtain the Langmuir-Blodgett (LB) film comprising the monolayer film of nanoparticles. A LB multilayer film comprising a laminate of nanoparticle monolayer films may also be produced by repeating the procedures as described above.

Figure 9A:
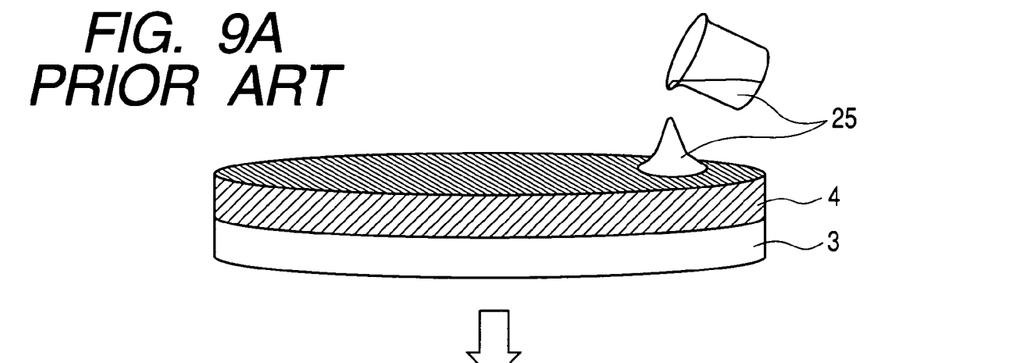
FIGS. 9A-9C are side views showing a prior art manufacturing process for producing a magnetic recording medium having a nanoparticle layer by spin coating method.
Figure 9B:
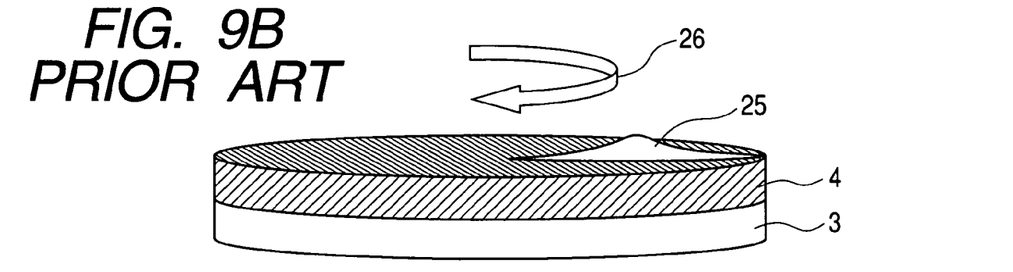
Figure 9C:
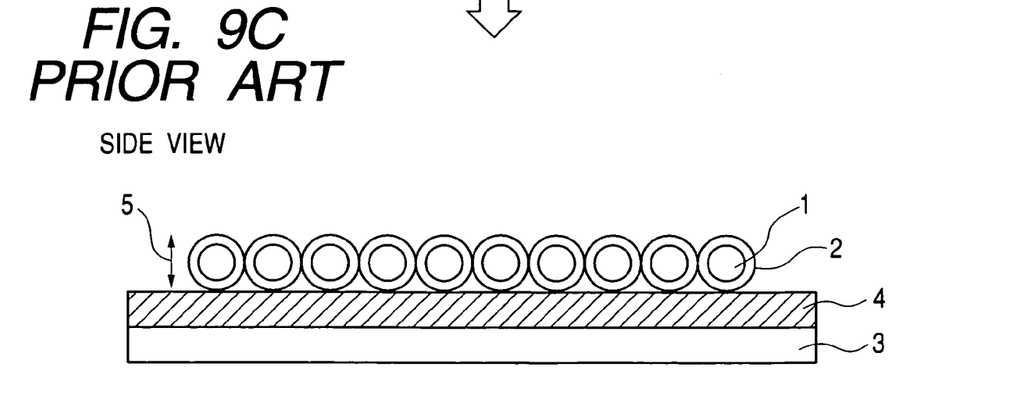

The recording layer comprising the nanoparticle layer may also be formed by spin coating as shown in FIGS. 9A-9C wherein the colloid solution 25 of the nanoparticles is dropped onto the surface of the substrate and a thin film is formed by rotating the substrate to the direction 26. When the molecular weight and the molecular structure of the compound coating the nanoparticles is adequately selected, and the concentration of the colloid solution is adjusted, and the rotation conditions are optimized, production of a recording layer comprising a substantially ordered array of closely packed nanoparticles is enabled. Methods other than those described above may also be employed for producing the recording layer comprising the nanoparticle layer.

The nanoparticles in the thus formed nanoparticle layer have cubic crystal fcc structure, and the nanoparticles are scarcely magnetized. Therefore, crystallographic structure of the nanoparticles needs to be converted to L10 ordered structure for magnetization. Referring to FIGS. 7A-7D, when the nanoparticle layer is irradiated with an infrared beam 9, the infrared beam is absorbed by the nanoparticles comprising a metal element 1 and turns into heat which causes partial change in crystallographic structure of the nanoparticles. The infrared beam 9 is well absorbed by the nanoparticles comprising a metal element 1 while it is less likely to be absorbed by the organic compound 2 or the crosslinking agent coating the nanoparticles, and therefore, the crystallographic structure of the nanoparticles can be converted from the cubic crystal fcc to L10 ordered structure for magnetization 20 of the nanoparticles without changing the quality of the organic compound 2 between the nanoparticles by adjusting the intensity and irradiation time of the infrared beam. Degree of the conversion of the nanoparticles from the cubic crystal fcc to the L10 ordered structure can be controlled by means of the infrared beam irradiated in this procedure. Conversion to the ordered structure can proceed to the level of 100% for further magnetization and ferromagnetism by increasing the intensity or the irradiation time of the infrared beam. The infrared beam used may preferably have a long wavelength of 600 nm or longer, and an infrared laser beam may be used for the infrared beam.

After the magnetization as described above, as shown in FIG. 7C, a magnetic field 16 is applied to orient the easy axis of magnetization of the each nanoparticle to a direction substantially parallel to a direction at a particular angle with the substrate surface. In this process, the direction of the magnetic field may be set parallel to the substrate surface, at 45 degrees to the substrate surface, perpendicular to the substrate surface, or at another selected angle. The magnetic field used may be either a static magnetic field wherein the direction and the intensity of the magnetic field does not change with time, or a pulse magnetic field wherein the direction of the magnetic field is constant while the intensity of the magnetic field alters with time. When the magnetic field is applied to the nanoparticle layer which has been magnetized as described above, the easy axis of magnetization of the each nanoparticle can be oriented to a direction substantially parallel to a direction at a particular angle with the substrate surface.

Figure 7A:
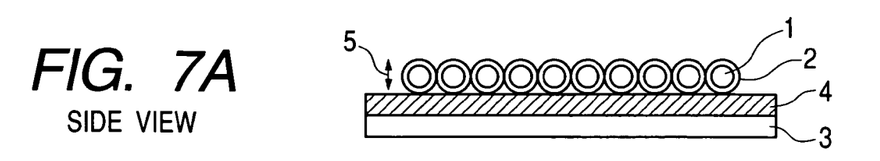
FIGS. 7A-7D are side views showing a manufacturing process for producing the magnetic recording medium having a nanoparticle layer wherein the easy axis of magnetization of nanoparticles is oriented in the same direction vertical to the substrate.
Figure 7B:
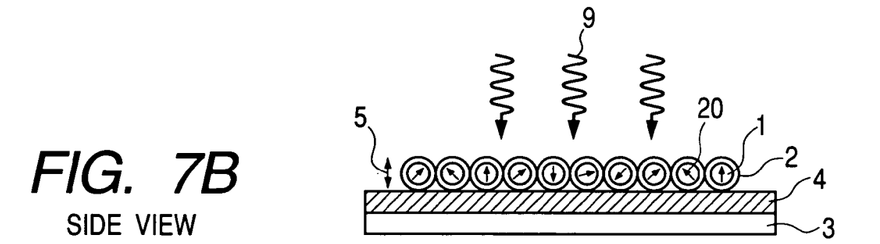
Figure 7C:
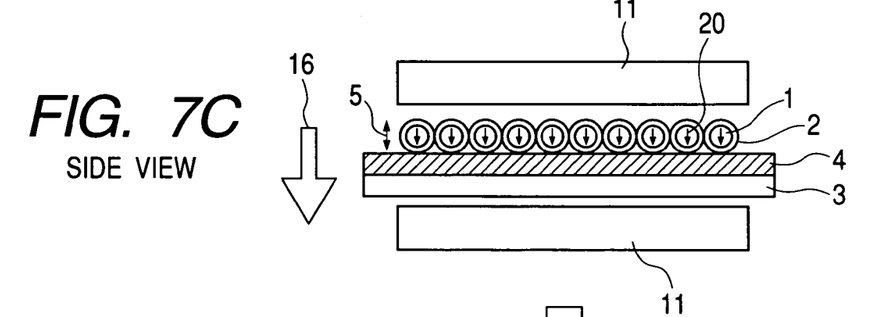
Figure 7D:
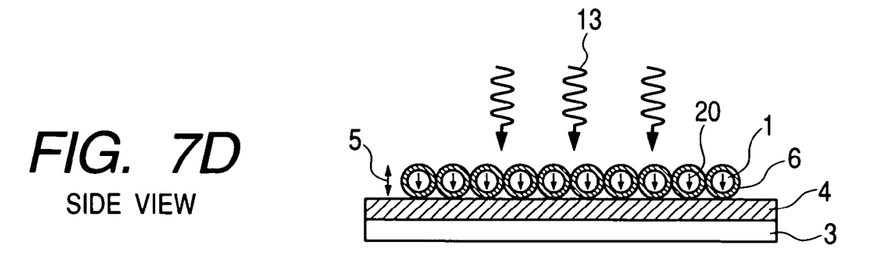

Next, as shown in FIG. 7D, the nanoparticle layer is irradiated with an ultraviolet beam 13 to fix the direction of the easy axis of magnetization. The ultraviolet beam irradiated is absorbed by the organic compound 2 between the nanoparticles to induce photochemical or thermochemical reaction to crosslink or bind the organic compound. When an organic compound such as a crosslinking agent capable of binding the organic compound coating the nanoparticles is present between the nanoparticles, crosslinking efficiency will be improved. The ultraviolet beam irradiated is preferably a short wavelength beam having a wavelength of up to 400 nm. The crosslinking efficiency can be further improved by adequately adjusting the structure of the crosslinking agent for crosslinking the organic compound between the nanoparticles, and also, by adjusting the wavelength, the intensity, and the irradiation time of the ultraviolet beam.

When the magnetization by the irradiation of the infrared beam is insufficient, the nanoparticles may be further ordered by conducting a heat treatment at a temperature of up to 300° C. for an arbitrary period after the step of binding the organic compound by the ultraviolet irradiation.

When a nanoparticle layer is irradiated with an infrared beam for magnetization, a magnetic field is then applied at a particular angle with the substrate surface to orient the easy axis of magnetization of the nanoparticles in the direction of the magnetic field, and the nanoparticle layer is further irradiated with an ultraviolet beam to crosslink the organic compound between the nanoparticle to thereby fix the nanoparticles as described above, a nanoparticle layer wherein the easy axis of magnetization is substantially parallel to a direction at a particular angle to the substrate surface can be obtained. In this procedure, when a magnetic field perpendicular to the substrate surface is applied, while adequately adjusting the intensity and the time of the magnetic field application, the layer obtained will be a perpendicular magnetic layer wherein number of nanoparticles wherein angle between the direction perpendicular to the substrate surface and the easy axis of magnetization of the nanoparticles is up to 5 degrees is at least 90% of the total number of nanoparticles included in the nanoparticle layer. Such magnetic layer exhibits favorable perpendicular magnetic anisotropy as well as excellent magnetic properties.

The recording of the information on the nanoparticle medium having the nanoparticle layer exhibiting the favorable perpendicular magnetic anisotropy as described above may be accomplished by a perpendicular magnetic recording system wherein the main component of the leakage magnetic field from the write head is perpendicular to the in-plane direction of the substrate. The recording may be also accomplished by a thermomagnetic or a magneto-optical recording system wherein magnetic recording is conducted while the recording area of the medium is selectively irradiated with heat or light.

Figure 3A:
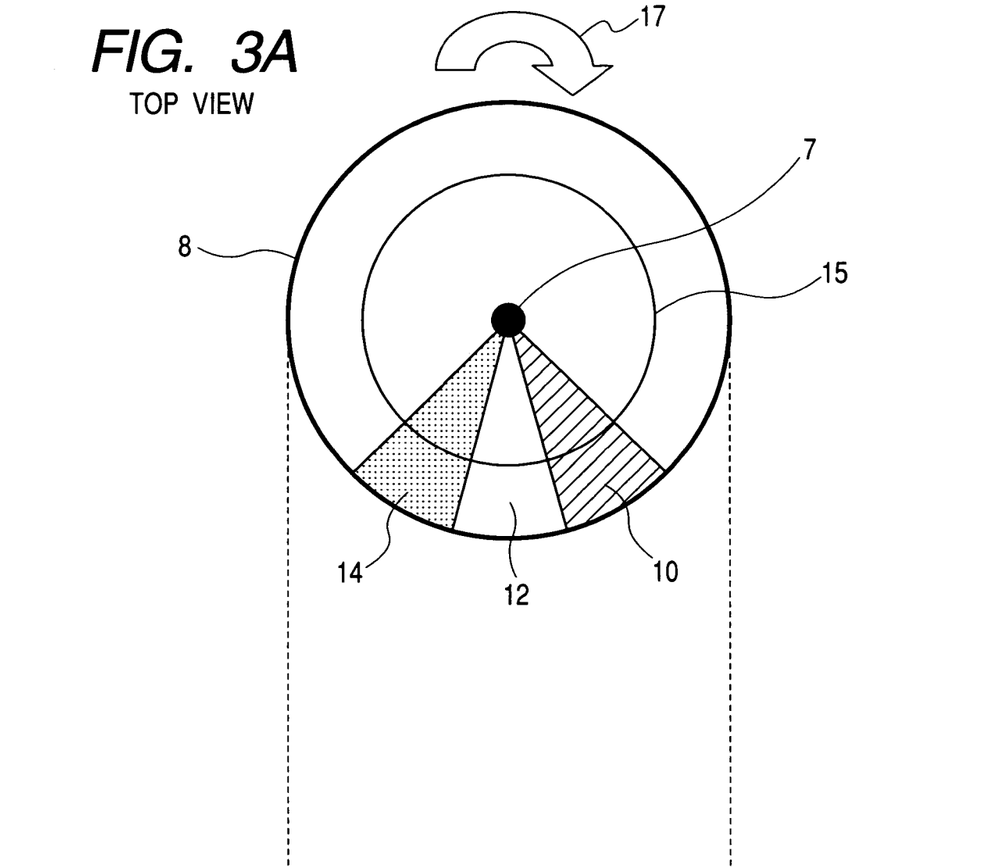
FIGS. 3A-3B are views showing an apparatus for producing the magnetic recording medium having a nanoparticle layer wherein the easy axis of magnetization of nanoparticles is oriented in the same direction parallel to the substrate.
Figure 3B:
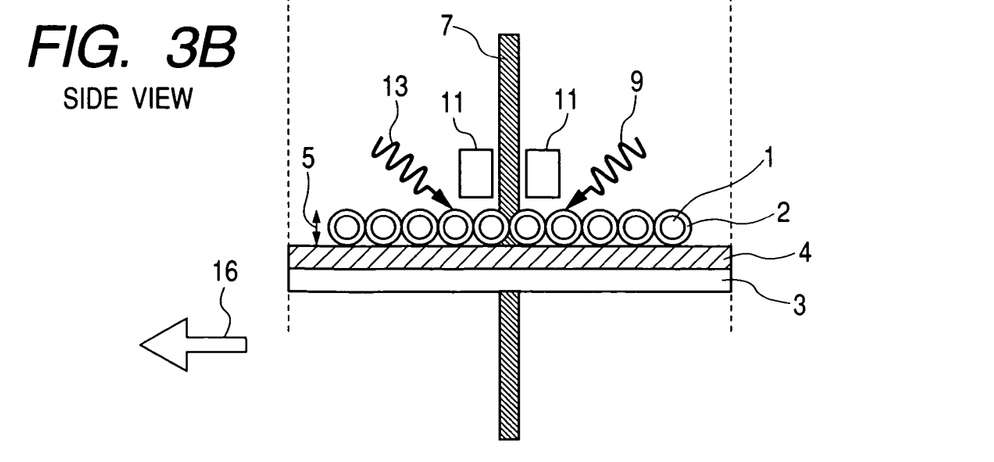

The apparatus used for producing a magnetic recording medium wherein easy axis of magnetization of the nanoparticles is oriented at a direction which is at a particular angle to the substrate surface may be the apparatus as shown in FIG. 3. This apparatus has a rotating section 8 which rotates the substrate 3 (see rotation direction 17 indicated) bearing the nanoparticle layer 5 at an arbitrary rotation speed around a particular rotation axis 7, and in this apparatus, an infrared irradiating section 10 for irradiating an infrared beam 9 to a particular region of said substrate, a magnetic field applying section 12 having coils 11 for applying(a magnetic field to said particular region after the infrared irradiation (see magnetic field direction 16), and an ultraviolet irradiating section 14 for irradiating a ultraviolet beam 13 to said particular region after the magnetic field application are concentrically arranged around on a circle 15 whose center is the rotation center. After such procedure, the organic compound coating the nanoparticle 1 or the compound 6 derived from the organic compound coating the nanoparticle will be present between the nanoparticles.

EXAMPLES

Next, the present invention is described in further detail by referring to the following Examples which by no means limit the scope of the invention.

Example 1

Figure 5A:
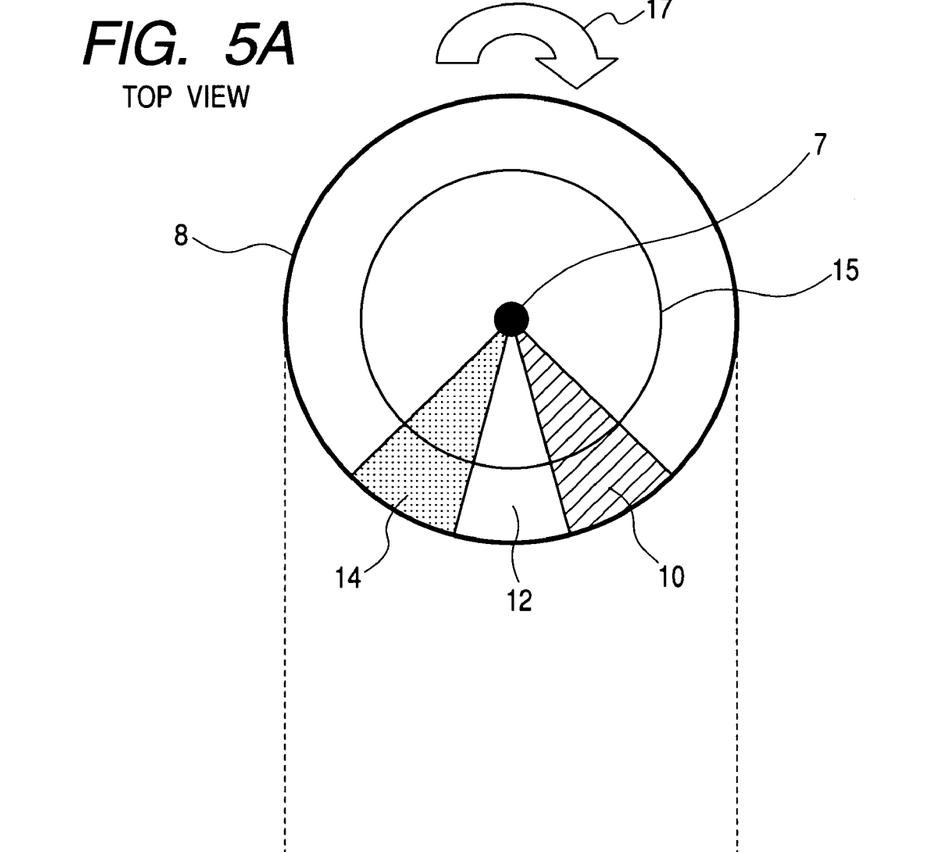
FIGS. 5A-5B is a view showing an apparatus for producing the magnetic recording medium having a nanoparticle layer wherein easy axis of magnetization of nanoparticles is oriented in the same direction vertical to the substrate.
Figure 5B:
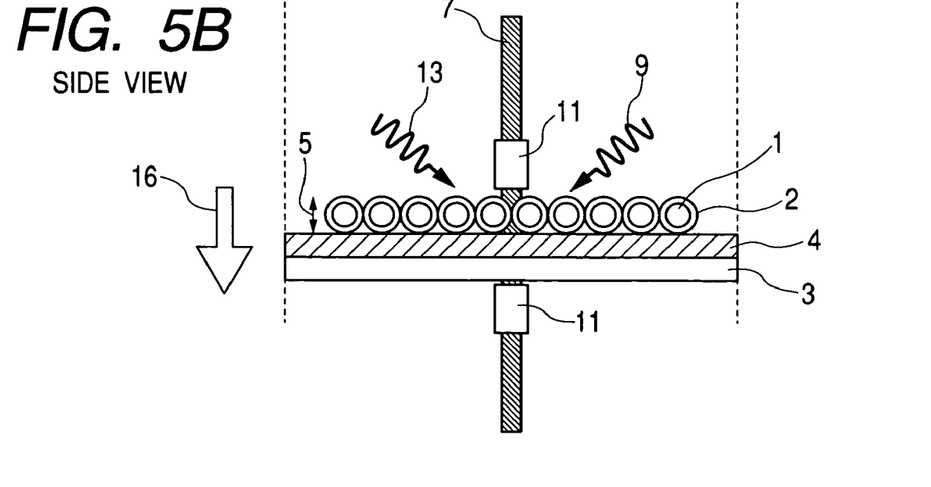
Figure 6:
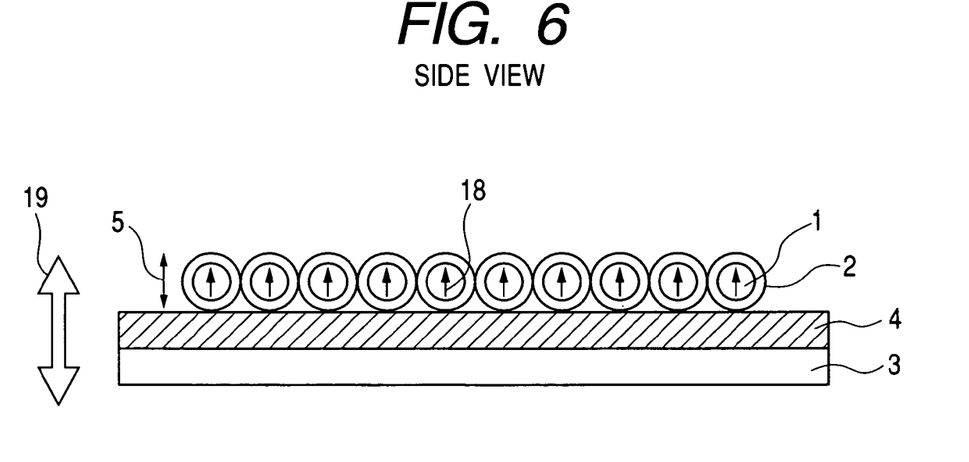
FIG. 6 is a side view of the magnetic recording medium having a nanoparticle layer wherein easy axis of magnetization of nanoparticles is oriented in the same direction vertical to the substrate.

Referring to FIGS. 5A & 5B, Spherical magnetic nanoparticles having a particle dispersion standard deviation degree of up to 10% and a diameter in the range of 1 to 20 nm were chemically synthesized, and the nanoparticles were classified by size in a centrifuge such that each class had a diameter dispersion standard deviation of up to 5%. In the thus produced colloid solution of the nanoparticles, nanoparticles comprising a magnetic metal element surrounded by a coating of an organic compound were dispersed as colloid. Next, the colloid solution of the nanoparticles as described above was dropped onto a soft magnetic layer which had been deposited on a glass substrate by sputtering, and the substrate was rotated for spin coating of the colloid solution to obtain a monolayer film of the nanoparticles which was then subjected to a prebaking at 80° C. for 5 minutes. The substrate having the thus formed nanoparticle layer thereon was rotated such that an arbitrary region of the nanoparticle layer was irradiated with an infrared beam 9 having a wavelength of 800 nm, and a magnetic field 16 in the direction perpendicular to the substrate surface was applied to this region at the very moment when this region passed between a pair of coils 11 having magnetic poles arranged on opposite sides of the substrate, and this region was further irradiated with an ultraviolet beam 13 having a wavelength of 200 nm immediately after passing between the coils. A perpendicular magnetic recording medium having a nanoparticle layer wherein the easy axis of magneti- zation 18 as shown in FIG. 6 is oriented at a direction 19 perpendicular to the in-plane direction of the substrate is thereby produced. This is the best mode.

Example 2

A monolayer film of the nanoparticle was formed by Langmuir-Blodgett method as shown in FIG. 8A-8C instead of the spin coating used in Example 1. The substrate having the thus formed nanoparticle layer thereon was rotated such that an arbitrary region of the nanoparticle layer was irradiated with an infrared beam having a wavelength of 800 nm, and a magnetic field in the direction perpendicular to the substrate surface was, applied to this region at the very moment when this region passed between a pair of coils having magnetic poles arranged on opposite sides of the substrate, and this region was further irradiated with an ultraviolet beam having a wavelength of 200 nm immediately after passing between the coils. A perpendicular magnetic recording medium having a nanoparticle layer wherein the easy axis of magnetization had been oriented at a direction perpendicular to the in-plane direction of the substrate was thereby produced.

Example 3

To the colloid solution of nanoparticles used in Example 1 was added a crosslinking agent represented by the general formula (1):

(1)

at an amount of 20% by weight of the colloid. The colloid solution having the crosslinking agent added thereto was dropped onto the surface of clean water to form a LB monolayer film of nanoparticles by Langmuir-Blodgett method. This LB monolayer film was transferred onto the substrate. When this LB monolayer film was observed under SEM, the resulting array of nanoparticles substantially had closest packed structure.

The substrate having the thus formed nanoparticle layer thereon was rotated such that an arbitrary region of the nanoparticle layer was irradiated with an infrared beam having a wavelength of 800 nm, and a magnetic field in the direction perpendicular to the substrate surface was applied to this region at the very moment when this region passed between a pair of coils having magnetic poles arranged on opposite sides of the substrate, and this region was further irradiated with an ultraviolet beam having a wavelength of 200 nm immediately after passing between the coils. A perpendicular magnetic recording medium having a nanoparticle layer wherein the easy axis of magnetization had been oriented at a direction perpendicular to the in-plane direction of the substrate was thereby produced.

Example 4

Figure 4A:
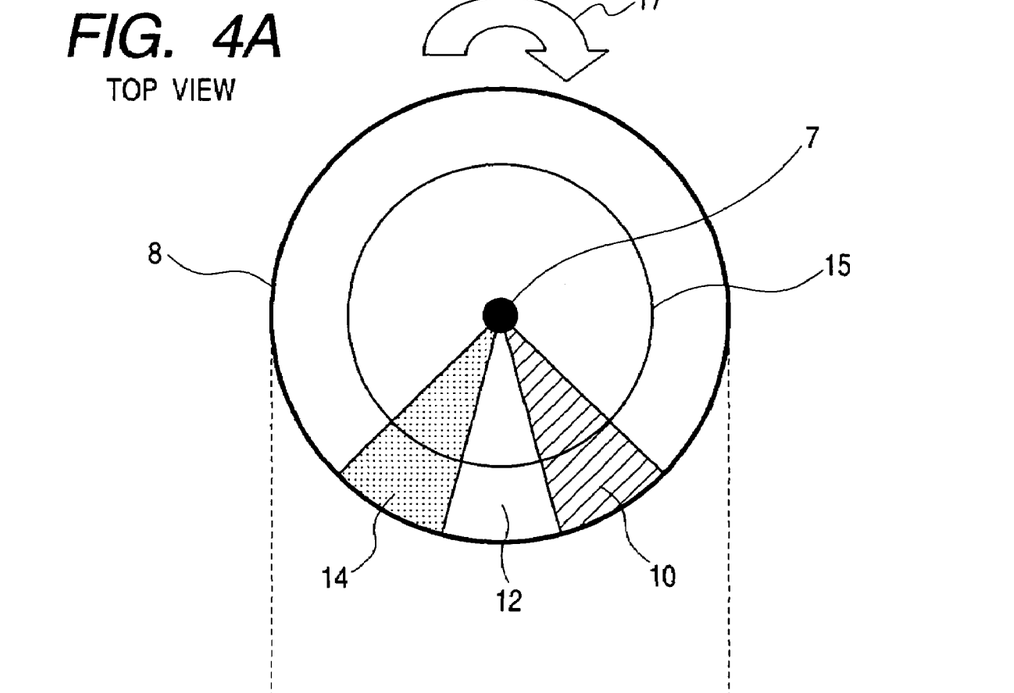
FIGS. 4A-4B are views showing an apparatus for producing the magnetic recording medium having a nanoparticle layer wherein the easy axis of magnetization of nanoparticles is oriented in the same direction inclined to the substrate at a 45-degrees.
Figure 4B:
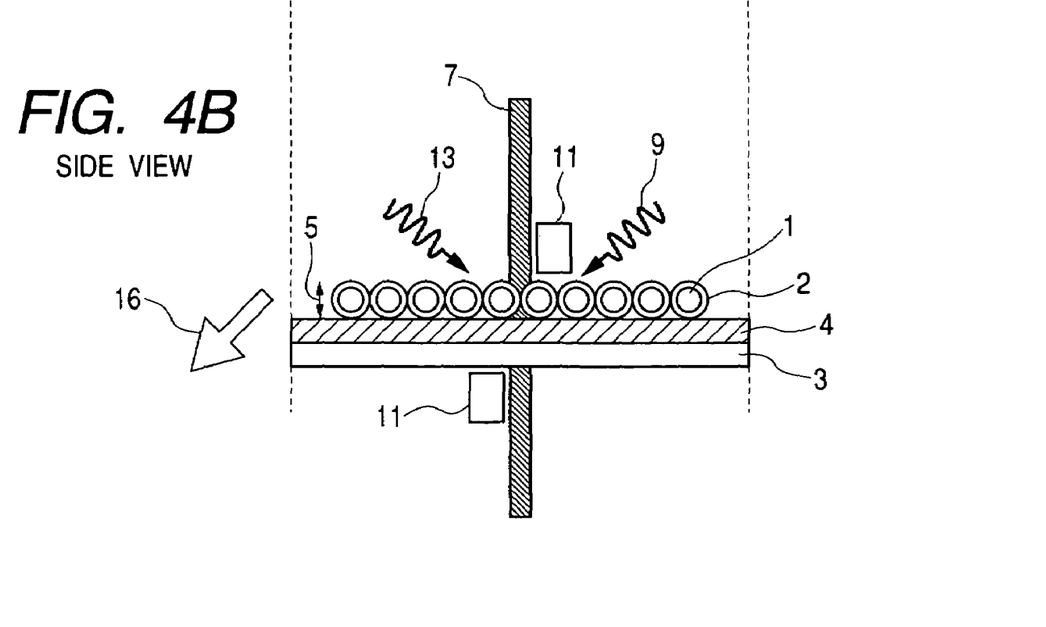

Referring to FIGS. 4A and 4B, the procedure of Example 3 was repeated by using a colloid solution of nanoparticles having a crosslinking agent added thereto to form a nanoparticle monolayer film by the LB method. The substrate having the thus formed nanoparticle layer thereon was rotated such that an arbitrary region of the nanoparticle layer was irradiated with an infrared beam having a wavelength of 800 nm and a magnetic field at an angle of 45 degrees to the substrate surface was applied to this region at the very moment when the region passed between a pair of coils having a pair of magnetic poles arranged on opposite sides of the substrate at an angle of 45 degrees with the substrate, and this region was irradiated with an ultraviolet beam having a wavelength of 200 nm immediately after passing between the coils. A magnetic recording medium having a nanoparticle layer wherein the easy axis of magnetization had been oriented at 45 degrees to the in-plane direction of the substrate was thereby produced.

Example 5

Referring to FIGS. 5A and 5B, the magnetic nanoparticle medium produced in Example 3 was evaluated by using a sample vibration magnetometer. A magnetization curve exhibiting excellent magnetic properties including a perpendicular coercive force of 800 kA/m (10000 Oe), a coersive force squareness ratio S* of 0.8, and a residual magnetization of 200 emu/cc was obtained.

Example 6

Figure 10A:
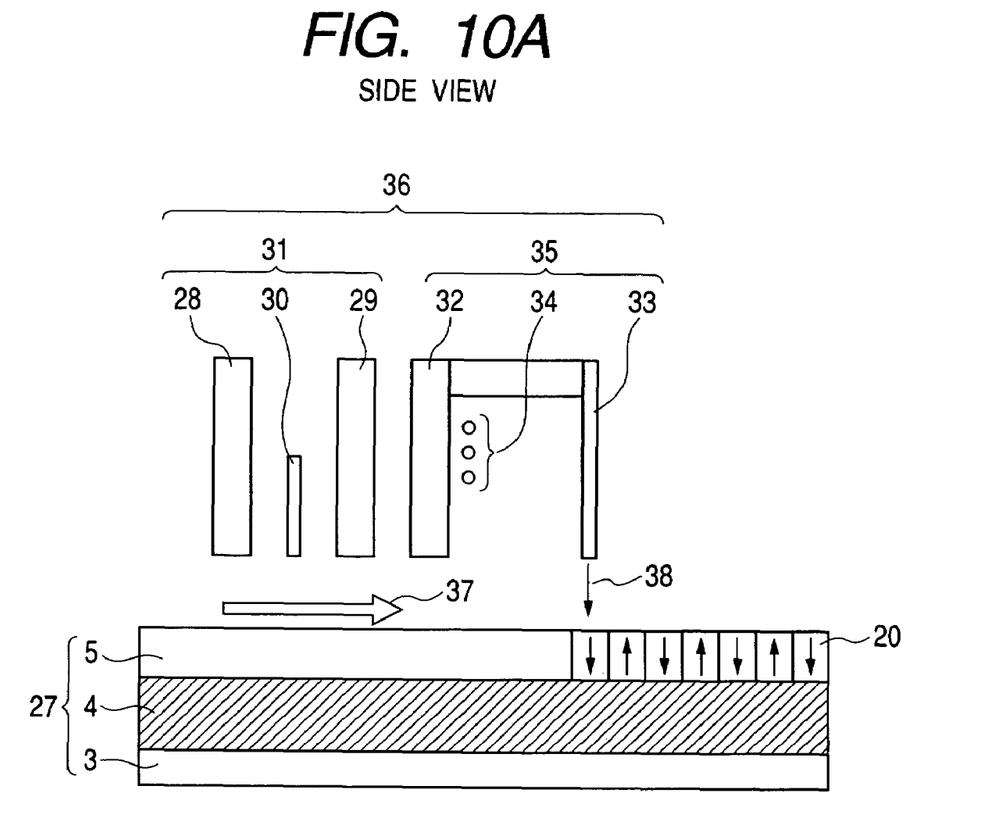
FIG. 10A-10B are a side view and a perspective view showing a magnetic read/write processes by using a head system comprising separate read and write heads.
Figure 10B:
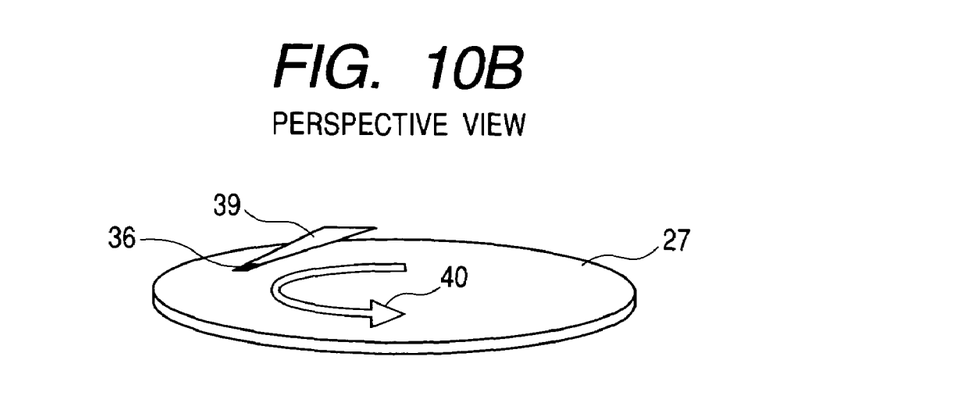

Referring to FIG. 10A-10B, the magnetic nanoparticle medium 27 produced in Example 3 was combined with a head system 36 comprising separate read and write heads employing a thin film single pole head for perpendicular magnetic recording for the write head 35 composed of an auxiliary pole 32, a main pole 33, and coils 34, and a GMR element 30 between shields 28, 29 for the read head 31 to evaluate the output. A magnetic flux 38 orients the direction of magnetization 20 of the medium to the same direction to the magnetic field while the medium moves to the direction 37. At the output evaluation, a magnetic nanoparticle medium 27 is rotated to the direction 40, and the head system 36 is mounted on an arm 39. A peak-to-peak output of about 1 mV was measured at a recording density of 100 kfci. The medium also exhibited an abrasion resistance equivalent to a conventional medium wherein the recording layer had been formed by sputtering.

Example 7

Figure 11A:
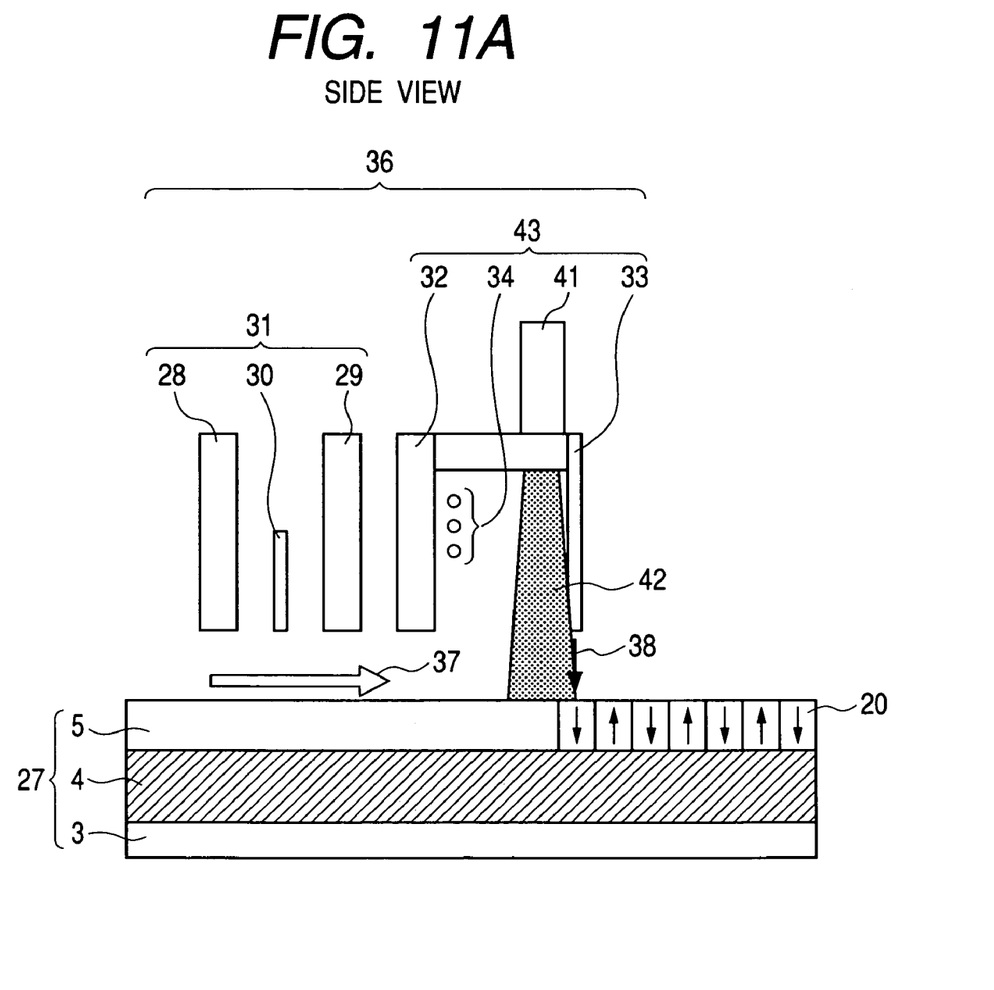
FIG. 11A-11B are a side view and a perspective view showing an optically assisted magnetic read/write processes by using a head system comprising separate read and write heads.
Figure 11B:
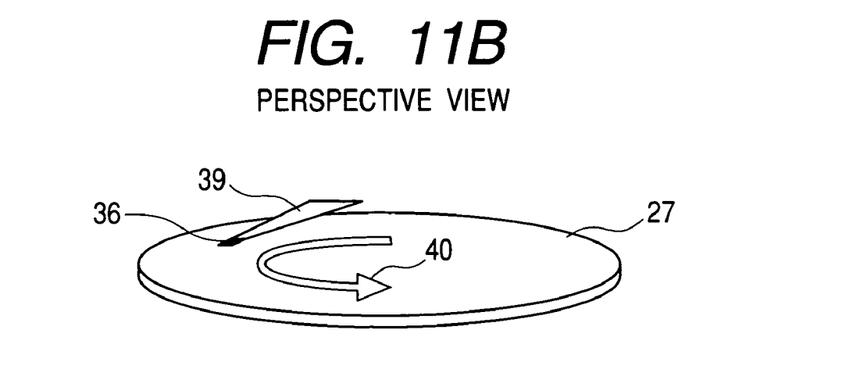

Referring to FIGS. 11A to 11B, a read/write experiment was conducted by using an optically assisted magnetic recording head 43 wherein only the recording area is heated by a light beam 42 from a laser 41 for the writing, and a GMR element 30 for the read head instead of the perpendicular magnetic recording used in Example 6. A peak-to-peak output of about 1 mV was measured at a recording density of 100 kfci.

Example 8

The magnetic nanoparticle medium produced in Example 3 was observed under SEM. No disturbance in the particle array or agglomeration of the particles induced by the heat treatment were observed. Observation under AFM revealed that the medium had a surface roughness Ra of up to 0.8.

In Example 3 as described above, the crosslinking agent used was the one represented by the general formula (1). The crosslinking agent of the formula (1), however, could be replaced with a compound represented by any one of the general formulae (2), (3), and (4). It is of course possible to conduct the following Examples 4 to 8 by using the product prepared by using the compound represented by any one of the general formulae (2), (3), and (4).

(2)

(3)

(4)

In the formulae, R1 to R9 are independently a functional group selected from carboxylic acids, phosphonic acids, phosphinic acids, sulfonic acids, sulfinic acids, thiols, hydroxyls, and hydrogen atom; or a hydrocarbon group containing carbon-carbon double bond or ether bond. R1 to R9 may be the same or different.

As described above, a magnetic recording medium provided with a magnetic recording layer wherein nanoparticles are arranged on the substrate in an ordered array and an organic compound is present between the nanoparticles could be produced, and in this medium, no high temperature heat treatment was necessary, flatness of the nanoparticle layer was improved compared to the conventional medium comprising the magnetic nanoparticles, the underlying layer or the soft magnetic layer did not experience deterioration, easy axis of magnetization of the nanoparticles was substantially parallel to a direction at a particular angle to said substrate surface, and magnetic properties were excellent. This medium could be recorded with information by magnetic recording.

Example 9

Referring to FIGS. 3A and 3B, the procedure of Example 3 was repeated by using a colloid solution of nanoparticles having a crosslinking agent added thereto to form a nanoparticle monolayer film by the LB method. The substrate having the thus formed nanoparticle layer thereon was rotated such that an arbitrary region of the nanoparticle layer was irradiated with an infrared beam having a wavelength of 800 nm and a magnetic field in the direction parallel to the substrate surface was applied to this region at the very moment when the region passed the area in which a pair of coils having a pair of magnetic poles arranged on the same side of the substrate in the direction parallel to the substrate, and this region was irradiated with an ultraviolet beam having a wavelength of 200 nm immediately after passing between the coils. A magnetic recording medium having a nanoparticle layer wherein the easy axis of magnetization had been oriented in the direction parallel to the substrate was thereby produced.

Although the above examples are provided applicants also envision variations and equivalents to the disclosure discussed above to be within the scope of this disclosure and the claims.

What is claimed is:
1. A magnetic recording medium, comprising:
   a substrate having a surface;
   a nanoparticle layer comprising an array of nanoparticles having an average particle size of at least 1 nm and not more than 20 nm, consisting of metal elements and containing at least one element selected from the group consisting of Fe, Co, Ni, Mn, Sm, Pt, or Pd; and
   an organic compound located between said array of nanoparticles,
   wherein an easy axis of magnetization of said nanoparticles is orientated substantially parallel to a direction which is at a particular angle to said substrate surface, and
   said organic compound located between said array of nanoparticles comprises an organic compound coating said nanoparticles or a compound derived from said organic compound coating the nanoparticles, and a crosslinking agent capable of binding adjacent organic compounds when it is irradiated with a light beam, a radiation or by applying heat,
   wherein said crosslinking agent has a structure selected from those represented by the general formulae (1) to (4):

(1)

(2)

(3)

(4)

wherein R1 to R9 are independently a functional group selected from the group consisting of carboxylic acids, phosphonic acids, phosphinic acids, sulfonic acids, sulfinic acids, thiols, hydroxyls, and a hydrogen atom; or a hydrocarbon group containing carbon-carbon double bond or ether bond.

2. A magnetic recording medium according to claim 1, wherein said organic compound located between said array of nanoparticles is either an organic compound coating said nanoparticles, or a compound derived from said organic compound coating the nanoparticles.

3. A magnetic recording medium according to claim 1, wherein said easy axis of magnetization of said nanoparticles is substantially parallel to the direction of said substrate surface.

4. A magnetic recording medium according to claim 1, wherein said easy axis of magnetization of said nanoparticles is orientated substantially parallel to a direction which is at 45 degrees to said substrate surface.

5. A magnetic recording medium according to claim 1, wherein said easy axis of magnetization of said nanoparticles is orientated substantially parallel to a direction which is perpendicular to said substrate surface.

6. A magnetic recording medium according to claim 1, wherein the number of nanoparticles, having an angle between the direction perpendicular to said substrate surface and the easy axis of magnetization of said nanoparticles is up to 5 degrees, constitutes at least 90% of total number of nanoparticles included in the nanoparticle layer.

7. A magnetic recording medium according to claim 1, wherein said nanoparticle layer comprises a monolayer film of said nanoparticles.

8. A magnetic recording medium according to claim 1, wherein said nanoparticles consist of metal elements containing at least one element selected from the group of Fe, Co, Pt and Pd, have a fcc structure, and the structure of the nanoparticles are converted to L10 ordered structure for magnetization by irradiation of infrared beam.

* * * * *